United States Patent [19]
Elliott

[11] Patent Number: 4,750,682
[45] Date of Patent: Jun. 14, 1988

[54] DRIVE HUB ASSEMBLY

[75] Inventor: Robert V. Elliott, Wells, England

[73] Assignee: THORN EMI Datatech Limited, Feltham, England

[21] Appl. No.: 13,508

[22] Filed: Feb. 11, 1987

[30] Foreign Application Priority Data

Feb. 11, 1986 [GB] United Kingdom ............... 8603313

[51] Int. Cl.$^4$ ..................... B65H 18/10; G11B 15/32
[52] U.S. Cl. .................... 242/68.2; 192/35; 192/75; 242/200; 242/201
[58] Field of Search ............ 242/46.2, 46.4, 68.3, 242/68.2, 72 R, 110.1, 200, 201, 206; 192/35, 75

[56] References Cited

U.S. PATENT DOCUMENTS

| | | | |
|---|---|---|---|
| 779,097 | 1/1905 | Phillips | 192/35 |
| 2,734,599 | 2/1956 | Merritt | 192/35 |
| 3,294,337 | 12/1966 | Jacob | 242/68.3 |
| 3,548,695 | 12/1970 | Patton | 242/68.3 |
| 3,801,033 | 4/1974 | Sanderson | 242/68.3 |
| 4,184,664 | 1/1980 | Ouriet | 242/72 R |
| 4,243,186 | 1/1981 | Peter et al. | 242/195 |
| 4,456,209 | 6/1984 | Kalizano | 242/68.3 |

FOREIGN PATENT DOCUMENTS

| | | |
|---|---|---|
| 310737 | 5/1929 | United Kingdom . |
| 584470 | 1/1947 | United Kingdom . |
| 719486 | 12/1954 | United Kingdom . |
| 793784 | 4/1958 | United Kingdom . |

Primary Examiner—Stuart S. Levy
Assistant Examiner—Katherine Matecki
Attorney, Agent, or Firm—Fleit, Jacobson, Cohn & Price

[57] ABSTRACT

A hub drive assembly includes three pairs of pivoted arms, each supporting a friction pad, which may be clamped against the inner cylindrical surface of a tape supply reel. The assembly also includes a central sleeve, rotatably driven by a motor, and a second sleeve concentric with the central sleeve. The second sleeve is provided with gear teeth, which couple with gear teeth of one arm, which in turn couple with gear teeth of the other arm of each pair. Means are also provided to rotate the two sleeves relative to each other, thereby causing rotation of the arms about their pivot points via the gear couplings, so as to bring the frictional pads into, and out of, frictional engagement with the reel.

6 Claims, 8 Drawing Sheets

FIG.8

DRIVE HUB ASSEMBLY

BACKGROUND OF THE INVENTION

(1) Field of the Invention

This invention relates to mechanisms for locking a rotatable load to a drive hub and for unlocking the load such that it may be readily removed when the drive hub is at rest. The invention is particularly, but not exclusively, suitable for use in magnetic tape transports in which the rotatable load is a reel of magnetic tape.

(2) Description of the Related Art

Many designs of magnetic tape transport have been provided with a supply reel drive hub including a number of retractable friction pads which, in a locked position, are spring loaded against the inner cylindrical surface of the supply reel and which may be retracted towards the hub centre to permit loading and unloading of the supply reel. U.S. Pat. No. 4,243,186, for example, discloses a supply reel hub in which the differential rotation of a pair of concentric rotors is used to operate the locking and retracting mechanism for three spring loaded friction pads and in which the mechanism may be automatically operated utilising the power of the supply hub drive motor. While such arrangements are satisfactory for many applications, they suffer from the disadvantage that, in the locked position, the driving torque for each friction pad is proportional to the applied spring pressure, and the spring pressure may vary from one friction pad to another. Such variation may result in the locking mechanism becoming only partially effective and unsuitable for use with high speed tape drives which are required to withstand high rotational accelerations and decelerations, such as intermittent motion fast start-stop digital tape handlers.

SUMMARY OF THE INVENTION

It is an object of the present invention to provide an improved mechanism for locking a rotatable load to a drive hub and for unlocking the load such that it may be readily removed.

According to a first aspect of the invention there is provided a drive hub assembly for imparting rotational drive to a load located over said assembly, said assembly including first and second concentric rotary members, means for providing relative rotation of said members, and means for radially clamping said load relative to said drive, said clamping means comprising frictional means pivotally mounted for rotation to provide frictional engagement and disengagement with said load, and gearing means coupling said second rotary member to said frictional means such that said relative rotation of said rotary members effects said rotation of said frictional means.

According to a second aspect of the invention there is provided a tape transport system including a drive hub assembly for imparting rotational drive to a tape supply reel located over said assembly and a motor for driving said assembly, said assembly comprising a first rotary member rotatably driven by said motor and a second rotary member concentric with said first member, means for providing relative rotation of said members, and means for radially clamping said reel relative to said drive, said clamping means comprising frictional means pivotally mounted for rotation to provide frictional engagement and disengagement with said reel, and gearing means coupling said second rotary member to said frictional means such that said relative rotation of said rotary members effects said rotation of said frictional means.

The invention will now be described, by way of example, with reference to the accompanying drawings:

DESCRIPTION OF THE PREFERRED EMBODIMENT

Figure 1:
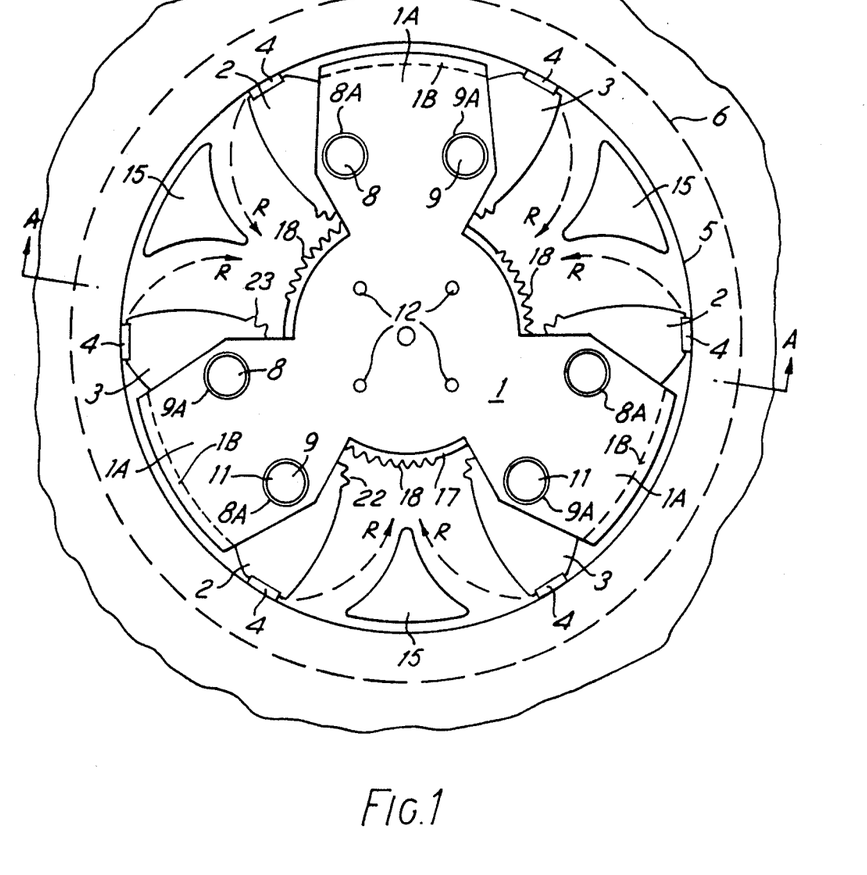
FIG. 1 is a plan view of a drive hub assembly according to the invention viewed from above showing three pairs of friction pads locked against a tape reel.
Figure 2:
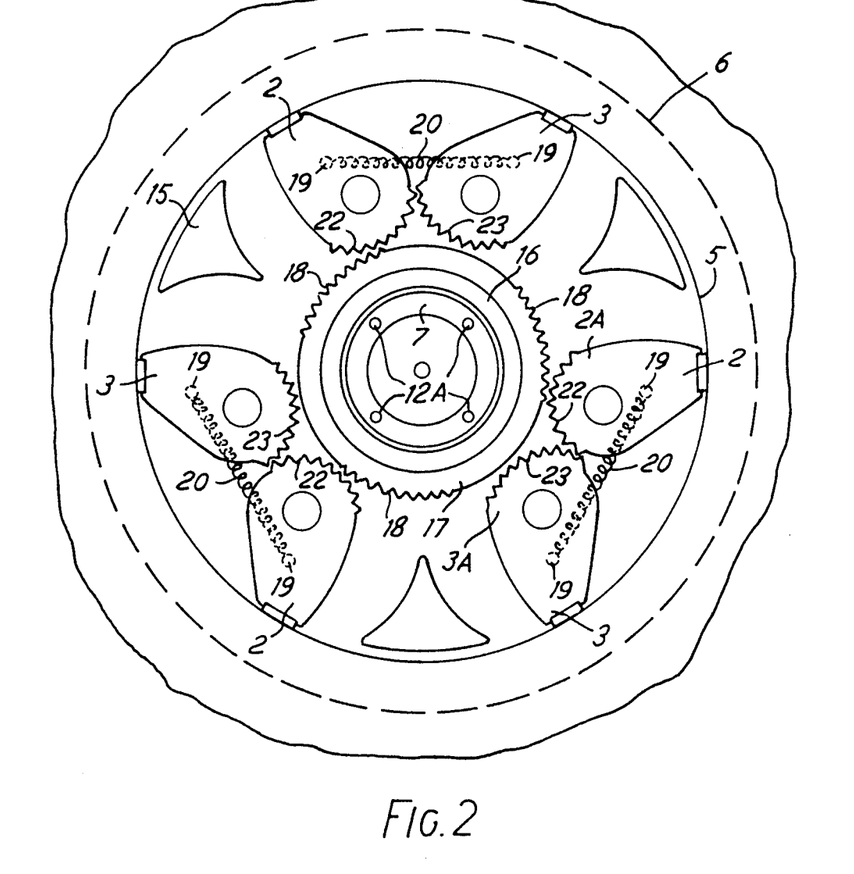
FIG. 2 shows a plan view of the hub assembly of FIG. 1 with its cover removed.
Figure 3:
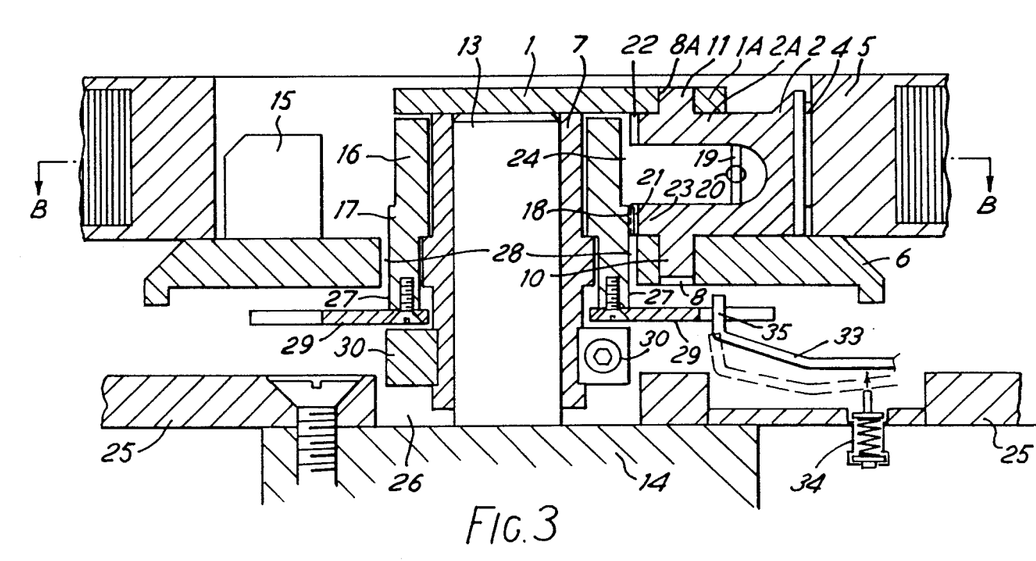
FIG. 3 is a diametric side sectional view of the hub assembly substantially along the line AA of FIG. 1, showing one friction pad locked against the tape reel.

FIGS. 1 and 2 show plan views of the hub assembly with and without a cover 1 respectively. The assembly includes three pairs of pivoted arms 2, 3. Each arm supports a friction pad 4 which may be locked against the inner cylindrical surface of a supply reel of magnetic tape 5. Referring also to FIGS. 3 and 7, the hub is provided with a body comprising a substantially annular shaped base plate 6 whose outer periphery extends beyond the inner surface of the reel and a concentric central sleeve 7 which extends vertically above and below the level of the annular base plate. The base plate 6 is provided with three pairs of pivot holes 8,9, shown in FIG. 7, into which vertical pivot pillars 10 fixed to the lower surface of each arm maybe inserted. A cover 1 is screw fixed to the upper surface of the central sleeve 7 utilising fixing holes 12 and 12A. The cover includes three equally spaced elements 1A extending radially outward of a central disc shaped region. Each radialy extending element is provided with a pair of pivot holes 8A and 9A which a re in vertical alignment with the holes 8 and 9 respectively in the base plate and into which pivot pillars 11 fixed to the upper surface of each arm are inserted when the cover is assembled to the central sleeve. The pivot pillars on the arms and the pivot holes in the base plate and cover are positoned such that the friction pads may be retracted to an unlocked position by suitably rotating the arms as is indicated by the arrows R of FIG. 1. The unlocked position of the friction pads and arms is shown in FIG. 6.

The central sleeve 7 is rigidly fixed to the spindle 13 of a drive motor 14 such that when the motor is energised, the hub body rotates with the motor. A tape reel may be loaded or unloaded when the motor is stationary and when the friction pads are retracted. Three guidance pillars 15 are mounted on an annulus of the upper surface of the base plate 16 interspersed between the elements 1A of the cover, each pillar having an outwardly facing part-cylindrical surface which provides guidance for a tape reel as it is loaded or unloaded. The outer peripheral surface of each radially extending element 1A of the cover is similarly part-cylindrical, and vertical outer wall portions 1B are provided at the periphery of the cover which extend downwardly to meet the upper surface of the base plate. The outer peripheral surfaces of the wall portions 1B and the pillars 15 form an interrupted cylindrical surface which will fit loosely into the central aperture of a tape reel when the friction pads are retracted. The two inwardly facing surfaces of each pillar 15 have a concave profile which permits the friction pads to freely retract and the three apertures between the radially extending adjacent elements 1A of the cover permit the friction pads to extend vertically above the level of the cover.

The friction pads are caused to lock or retract by the limited rotation of a rotor sleeve 16 relative to the hub body. The rotor sleeve is a hollow cylinder which encloses the upper extending portion of the central sleeve 7 of the hub body with a sliding fit. The lower end surface of the rotor sleeve rests on the hub body base plate 6 and the upper end surface of the rotor sleeve lies immediately below the central disc shaped region of the cover 1. The lower end region of the rotor sleeve is provided with an outwardly extending flange 17 which supports at its periphery three equally spaced sets of gear teeth 18.

Figure 4:
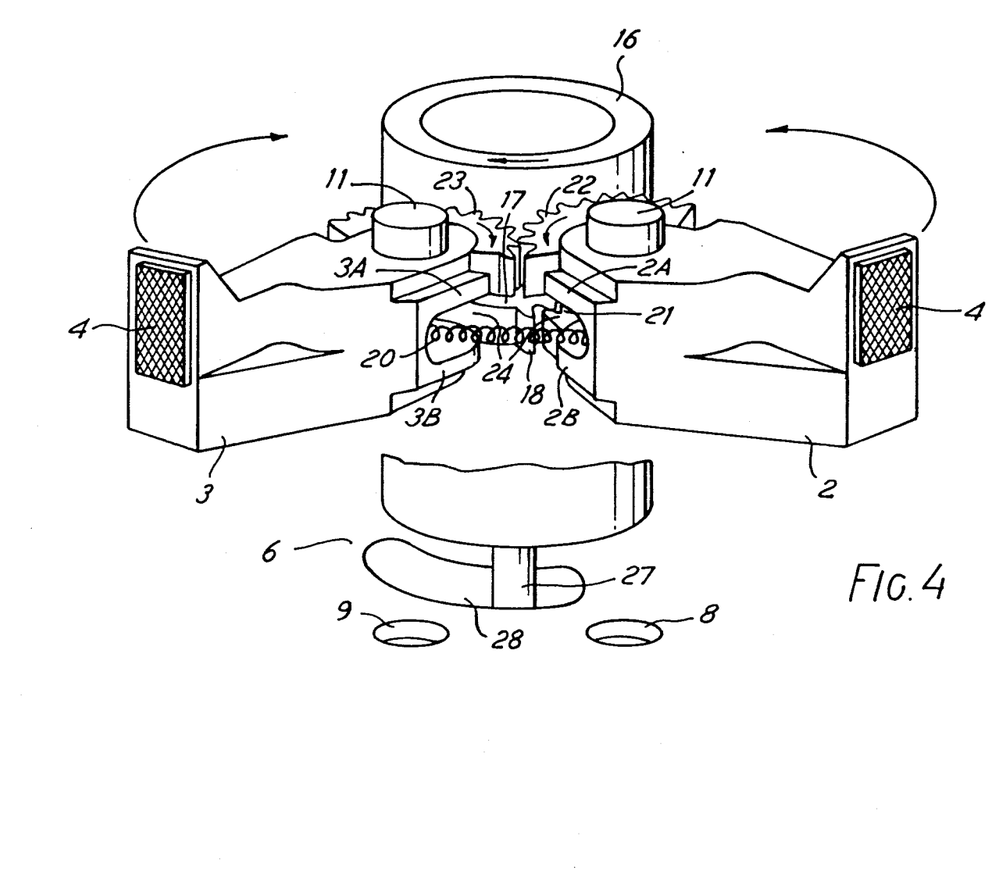
FIG. 4 is a schematic perspective representation of a rotor and arm assembly used in locking and unlocking one pair of friction pads.
Figure 5:
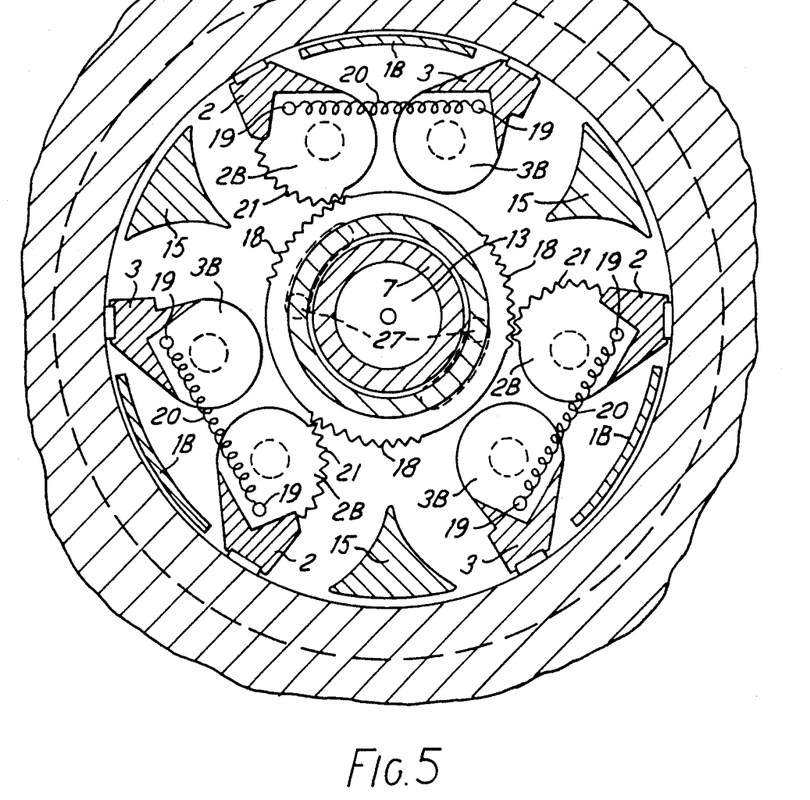
FIG. 5 is a sectional plan view of the hub assembly of FIGS. 1 and 2 substantially along the line BB of FIG. 3.
Figure 6:
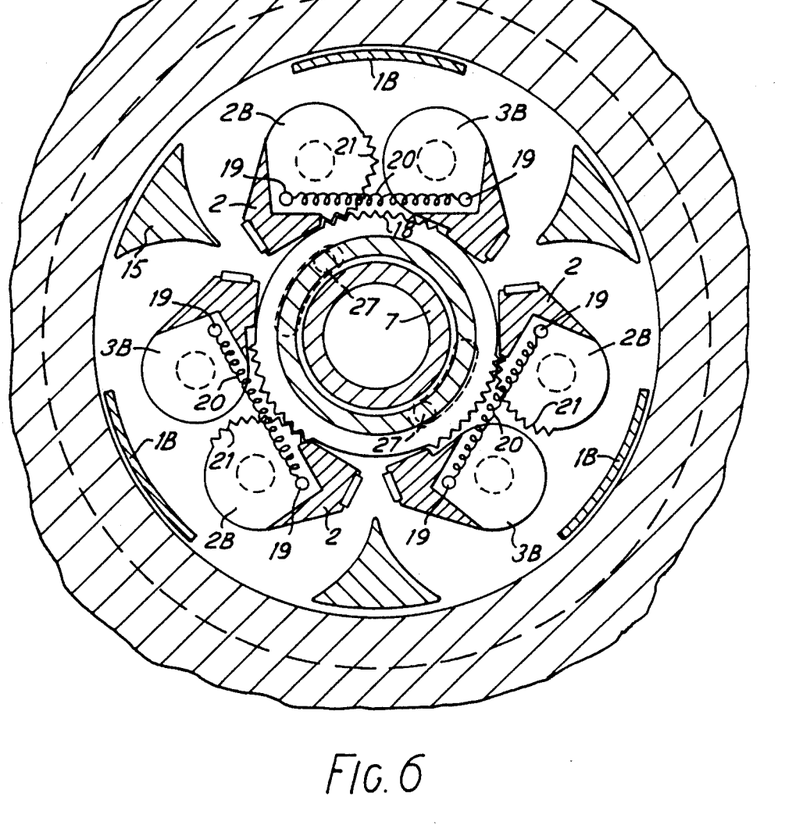
FIG. 6 is a sectional plan view of the hub assembly at the same level as FIG. 5 showing the friction pads retracted to an unlocked position.
Figure 7:
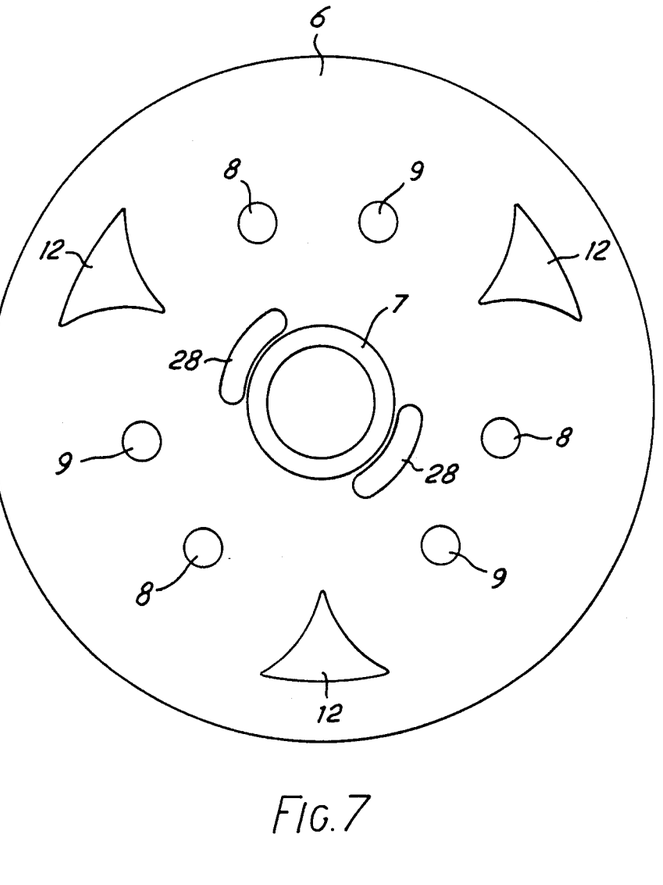
FIG. 7 is a plan view of a hub body with its cover and other components removed.

Referring to FIG. 4 in association with FIGS. 2, 3, 5 and 6, each of the three pairs of arms supporting friction pads 4 has a driving arm 2 and a driven arm 3. Each arm has a centrally disposed horizontal recess 24 extending from the surface remote from its associated friction pad to a region lying between its pivot pillar and the friction pad, thereby providing each driving arm 2 with upper and lower portions 2A and 2B and each driven arm 3 with upper and lower portions 3A and 3B. A vertical pin 19 extends through each horizontal recess, each pin being supported in inwardly facing holes in respective upper and lower portions of the associated arm. A horizontal spring 20 links respective pins 19 of the driving arm 2 and the driven arm 3 in each pair of arms such that it urges the associated pair of friction pads towards one another. Each pin 19 is positioned between its associated pivot pillar and friction pad such that when the mechanism operates to rotate the arms in the direction of the arrows R of FIG. 1, from a locked position towards an unlocked position, each spring first extends until it passes an "over-centre" position when it urges its associated pair of arms towards a fully retracted position. FIGS. 5 and 6 show the positions of the arms and springs in the locked and unlocked positions respectively and show the internal shape of each horizontal recess, this providing clearance for both end regions of each spring 20 to freely move within their associated recesses as the arms are rotated. Conversely, when the mechanism operates to rotate the arms from a retracted unlocked to a locked position, each spring similarly passes the "over-centre" position to urge its associated pair of arms towards a fully locked position. The lower portions 2B, 3B of the arms are at the same level as the rotor sleeve flange 17, and the driving arms 2 are linked to the rotor sleeve 16 by a gear mechanism. Each driving arm lower portion 2B is provided with a plurality of gear teeth 21 which engage the gear teeth 18 on the periphery of the rotor sleeve flange. The driven arms 3, however, have no gear teeth on the lower portions 3B and do not contact the flange 17. FIGS. 5 and 6 show the lower arm portions in locked and unlocked positions respectively and indicate the positioning of gear teeth 18 and 21 such that a clockwise rotation of the rotor sleeve relative to the hub body causes the driving arms 2 to retract anti-clockwise. The upper portions 2A and 3A of each driving and driven arm, 2 and 3 respectively, are provided with a plurality of gear teeth 22 and 23 respectively which engage as shown in FIGS. 2 and 4 such that when a driving arm is rotated anti-clockwise the associated driven arm rotates clockwise and vice-versa. Thus, a locked hub may be unlocked by a limited clockwise rotation of the rotor sleeve relative to the hub body and the springs 20 will assist the unlocking once they have passed the over-centre position. Conversely an unlocked hub may be locked to a tape reel by a limited anti-clockwise rotation of the rotor sleeve relative to the body and the springs will assist the locking when past the over-centre position.

The friction pads are of a resilient material such as a synthetic elastomer and friction pads of a fluoroelastomer obtainable from Du Pont under the trade name "VITON", having a thickness of 1.6 mm, have been found to be particularly effective.

The gear teeth engagements 18-21 and 22-23 are each designed to have a controlled backlash of substantially 2.5°. This backlash permits a small independent rotation of each arm relative to the remaining arms and to the rotor sleeve as the friction pads approach the inner cylindrical surface of the tape reel during a locking operating, and the resilience of the springs and of the friction pads ensures the smooth engagement of all six pads. If there were no backlash, the six arms would be tightly linked to one another and one or more of the friction pads may not fully engage.

When the hub and reel are stationary and in a locked position, the grip of each pair of friction pads is dependent on the strength of the associated stretch spring 20. If the locked hub and reel are then rotated by the motor in a clockwise direction, the friction pads on the three driven arms 3 are radially ahead of their associated pivots points. The reel, in frictional contact with the friction pads, has a tendency, due to its inertia, to remain stationary as the hub is accelerated and, through the frictional contact, to oppose the rotation of the friction pads. The tendency to oppose the rotation of the friction pads on the driven arms 3, since they are radially ahead of their pivot points, results in a wedging action on the friction pads with positive feedback, and the grip force on the three friction pads on the driven arms rapidly increases to a level which masks the effect of the spring strength. The friction pads on the driving arms 2, however, radially lag their pivot points and are not subject to a wedging action. Thus, in clockwise rotation, the grip force is largely provided by the three friction pads on the driven arms 3 and is substantially independent of the three spring strengths.

Conversely, when the locked hub and reel are rotated by the motor in an anti-clockwise direction, the friction pads on the three driving arms 2 are radially ahead of their pivot points and largely provide the grip force, which again becomes substantially independent of the three spring strengths.

Figure 8:
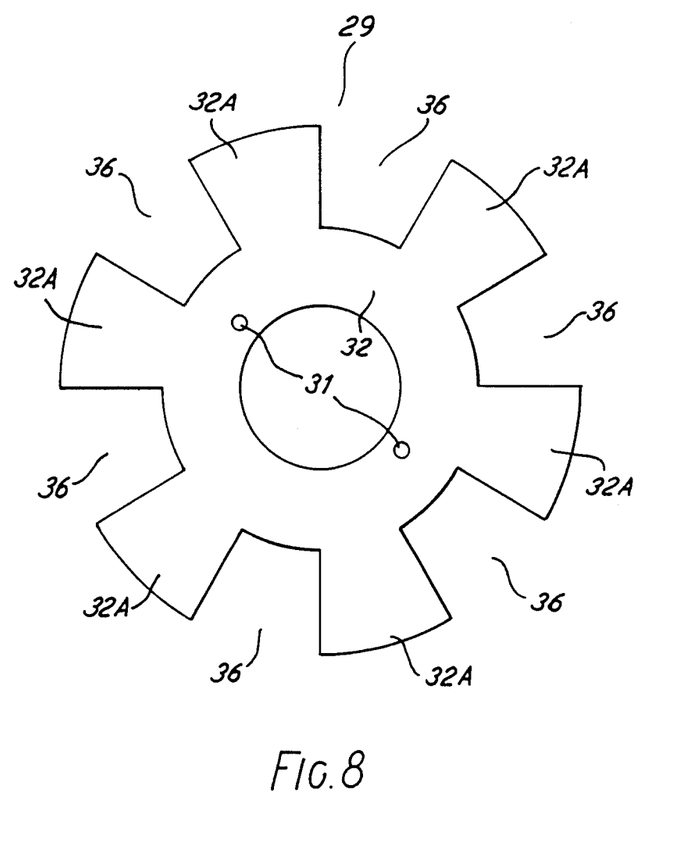
FIG. 8 is a plan view of a castellated locking ring.

The hub assembly is provided with means for automatically locking or unlocking the friction pads utilising the power of the drive motor. Referring to FIG. 3, the supply reel drive motor 14 is screw fixed to the underside of the deck plate 25 of a magnetic tape drive and the motor drive shaft 13 extends vertically above the deck plate. The drive shaft is firmly fixed in the central sleeve 7 by means of a screw clamp 30. The rotor sleeve 16 is provided with two diametrically opposed pillars 27 which extend vertically downward from its lower surface. Referring also to FIG. 7 and to the schematic representation shown in the lower, exploded, part of FIG. 4, the annular base plate 6 of the hub body is provided with two diametrically opposed arcuate through-slots 28 through which the pillars 27 extend. The pillars 27 fit freely through the slots 28, and the slots define the permitted extent of rotation of the rotor sleeve relative to the body. The hub assembly is locked when the pillars 27 are positioned fully anti-clockwise in the slots, as shown in FIG. 5, and the hub assembly is unlocked when the pillars 27 are positioned fully clockwise in the slots, as shown in FIG. 6. A castellated ring 29, shown in FIG. 8, is screw-fixed to the lower end faces of the two pillars 27 through a pair of fixing holes 31. The castellated ring has a central circular aperture into which the central sleeve 7 freely fits and has six evenly spaced vane portions 32A extending radially outward from an annular shaped region 32. A retractable actuating arm 33 and operating solenoid 34 are mounted to the deck plate 25. The actuating arm has a substantially vertical end region 35 which lies below the level of the castellated ring when the solenoid is unenergised and which is capable of rising through one of the apertures 36 between the castellated ring vane portions 32A when the solenoid is energised.

In order to lock the hub to a tape reel, the hub is initially in the unlocked position, with the friction pads retracted, and the tape reel is placed on the hub. The solenoid 34 is then energised and the motor is slowly rotated in a clockwise direction, causing the hub body to rotate. The rotor sleeve 16 is a sliding fit on the central sleeve 7 of the hub body and will rotate with the hub body unless impeded. If the actuator arm end 35 initially lies immediately beneath an aperture 36, it will enter the aperture and will prevent the rotor sleeve from further rotation once it contacts the side of a vane 32A. If the actuator arm end 35 initially lies under a vane 32, the pressure of the energised solenoid lightly urges the arm end 35 against the lower surface of the vane portion, but with insufficient pressure to prevent rotation of the rotor sleeve. The rotor sleeve and the hub body rotate and when an aperture 36 lies directly above the actuator arm end, the arm end enters the aperture and will prevent the rotor sleeve from further rotation once it contacts the side of the vane. When the rotor sleeve has stopped rotating, the hub body continues to rotate clockwise, thereby driving the friction pads and arms past their over centre position to the locked position. Once locked, the solenoid 34 is de-energised and the actuating arm 33 retracts.

In order to unlock a locked hub and enable a tape reel to be readily removed from a hub, the actuator arm and solenoid are similarly operated with the motor rotating in an anti-clockwise direction, thereby causing the hub body to rotate anti-clockwise relative to the hub when the arm end 35 enters an aperture 36 and contacts the side of a vane, and thus retracting the friction pads and arms beyond over centre to the unlocked position. Once unlocked, the solenoid is de-energised and the actuating arm retracts The above description is by way of example only, and alternative embodiments of the invention will be apparent to those skilled in the art.

It will be further apparent to those skilled in the art that the present invention is not limited in application to magnetic tape drives, and would be suitable for use with other devices which require a removeable rotatable load to be locked to a drive hub.

I claim:

1. A drive hub assembly for imparting rotational drive to a load located over said assembly, said assembly including first and second concentric rotary members, means for providing relative rotation of said members about a common axis of rotation, and means for radially clamping said load relative to said assembly, said clamping means comprising frictional means pivotally mounted on said first rotary member for rotation to provide frictional engagement and disengagement with said load, and gearing means coupling said second rotary member to said frictional means such that said relative rotation of said rotary members effects said rotation of said frictional means, wherein said frictional means comprises a number of pairs of frictional elements spaced around said rotary members, the elements of each pair being pivotally mounted for rotation relative to each other, said gearing means including first gearing coupling said second rotary member to one of the elements of each pair and second gearing coupling together the elements of each pair.

2. An assembly as claimed in claim 1 wherein each element comprises a pivotally mounted arm supporting a friction pad for engagement with said load, the pivot point of the arm and said friction pad being radially misaligned in relation to the centre of rotation of said rotary members.

3. An assembly as claimed in claim 1 wherein the gearing means are provided with a backlash to permit independent rotation of each element relative to the other elements and to the second rotary member.

4. An assembly as claimed in claim 3 wherein the backlash is approximately 2.5'.

5. An assembly as claimed in claim 1, wherein the elements of each pair are linked by bistable resilient means for biasing said elements either towards said rotary members, when disengaging from said load, or towards said load, when engaging therewith.

6. A tape transport system including a drive hub assembly for incorporating rotational drive to a tape supply reel and a motor for driving said assembly, said assembly comprising a first rotary member attached to a drive shaft driven by said motor, a second rotary member concentric with said first rotary member and said drive shaft, means for providing relative rotation of said rotary members comprising braking means for inhibiting rotation of said second member while said first member is rotated by the motor, means for radially clamping and unclamping said supply reel relative to said assembly comprising a number of pairs of frictional elements spaced around said rotary members, each element being separately pivotally mounted on said first rotary member to provide frictional engagement and disengagement with said reel, and gearing means comprising first gearing coupling said second rotary member to one of the elements of each pair and second gearing coupling together both elements of each pair, such that clamping may be effected by driving the motor in a forward rotational direction and unclamping may be effected by driving the motor in a reverse direction.

* * * * *